July 2, 1940.   G. O. BENSON   2,206,019
HANDLE FOR FISH POLES
Filed Nov. 20, 1937
Fig. 1.
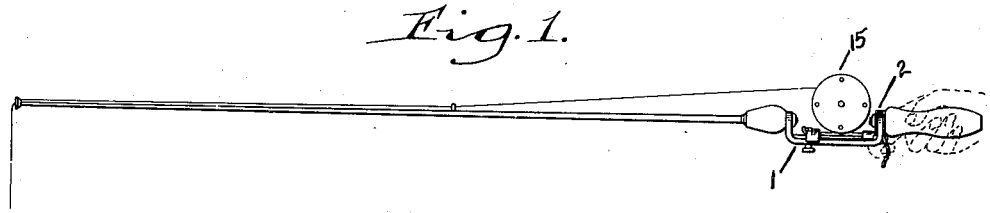
Fig. 2.
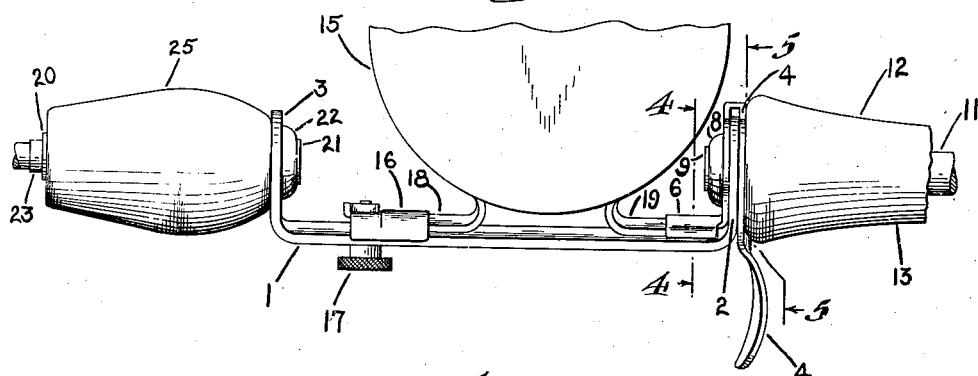
Fig. 3.
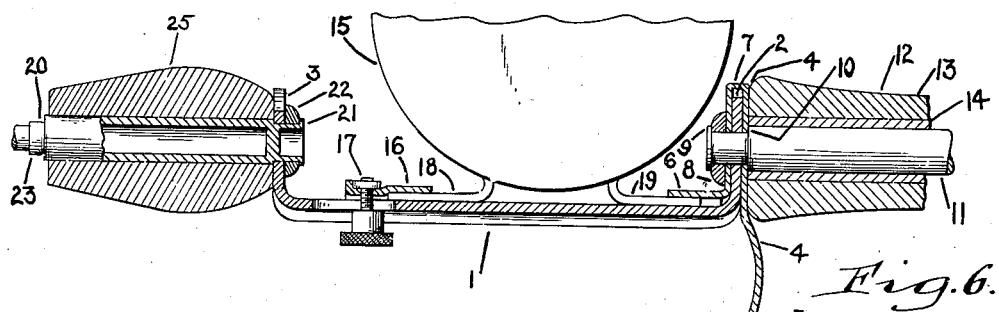
Fig. 4.   Fig. 5.   Fig. 6.
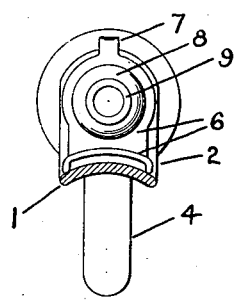 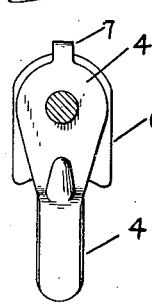 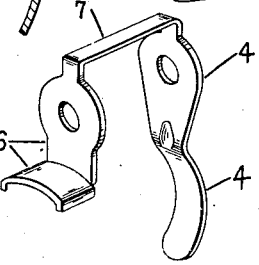
Inventor,
George O. Benson
by William G. Foley
Attorney.

Patented July 2, 1940

2,206,019

UNITED STATES PATENT OFFICE 2,206,019

HANDLE FOR FISH POLES

George O. Benson, Niagara Falls, N. Y., assignor to Chisolm-Ryder Co., Inc., Niagara Falls, N. Y., a corporation of New York Application November 20, 1937, Serial No. 175,683

8 Claims. (Cl. 43—23)

This invention relates to handles for fish poles and the like and has for its object the provision of an improved handle that can be made economically. More particularly, the present invention relates to handles for casting rods and has for its object the provision of a detachable offset handle at low cost to manufacture.

The present application is a continuation in part of my copending application Serial #77,540, filed May 2, 1936.

An understanding of the invention can be obtained by reference to the attached drawing, in which Figure 1 is an assembly drawing of the handle with the rod and reel in place;

Figure 2 is an elevation of the handle and shows a portion of the reel;

Figure 3 is a view similar to Figure 2 except that the handle is in section;

Figure 4 is an end view partly in elevation and partly in section through the line 4—4 of Figure 2;

Figure 5 is a sectional view taken through the line 5—5 of Figure 2; and

Figure 6 is a somewhat expanded view of a part of the handle including a finger hook.

Throughout the drawing a given part is referred to by the same reference numeral.

In Figures 1, 2 and 3 there is shown a handle comprising a body member 1 having legs 2 and 3 upturned therefrom at the ends.

Adjoining the upturned leg 2 on one side is shown a finger hook 4 and on the opposite side of the leg 2 an L-shaped member 6. The said finger hook 4 and the said L-shaped member 6 are shown to be joined by a strap 7. In Figure 6 the strap 7 joining the finger hook 4 and the L-shaped member 6 is shown longer than it is made in practice (and shown in Figures 2 and 3) for illustration purposes only.

In Figures 1, 2 and 3, and more particularly in Figures 2 and 3, the details of the assembly are shown. The upturned leg 2 of the body member 1, the finger hook 4 and the L-shaped member 6 are shown to be united into a unitary structure by the ring or washer 8, the riveted over portion 9 and the shoulder 10 of the hand grip support or grip pin 11.

The hand grip 12 consists of a body 13 of cork, wood, or the like having a hole through it and lined with a tube 14 of wood or other material suitable for the purpose of providing firmness and wear resistance. If desired, the tube 14 may be omitted.

A reel 15 is shown attached to the body member 1 of the handle by means of a clip 16 and bolt 17 and the L-shaped member 6 which engage respectively the feet 18 and 19 of the reel.

Each of the parts of the handle described herein is simple and inexpensive to manufacture and the assembly of the parts can be accomplished quickly and inexpensively.

The body portion 1 of the handle and the part forming the finger hook 4 and L-shaped member 6 together with the connecting portion 7 are metal stampings. The ring or washer 8, likewise is a metal stamping although it can be made by other methods if desired. The handle support or grip pin is formed from a rod by turning one end to a smaller diameter, thus forming a shoulder, and is drilled out at the reduced portion so that it forms a hollow rivet. If desired, the handle support or grip pin can be made of tubular form to decrease the weight of the handle.

The assembly of the hand grip portion of the handle is accomplished as follows. The part consisting of the L-shaped member 6, the finger hook 4 and the connecting member 7 is slipped over the leg 2 of the body member so that the holes in said members are in register with the hole in the leg 2 of the body member. The reduced portion of the hand grip support or grip pin 11 is then inserted in the registering holes and caused to project beyond the L-shaped member 6. The ring or washer 8 is then slipped over the small end of the hand grip support or grip pin and the assembly is ready to be united into a unitary body. This is accomplished preferably by riveting over the end of the small diameter portion of the hand grip support.

The riveted construction as shown is an inexpensive way to join the various members but other means may be employed if desired. For example, the ring or washer 8 may be omitted and the riveted portion 9 may be driven directly against the L-shaped member 6; or the grip support or grip pin 11 may be threaded and a nut may be drawn up on the thus threaded portion to join the various members. If desired, the pin 11 can be welded to the leg 2 of the body member, or to the L-shaped member 6 or to both the leg and the L-shaped member.

By making the finger hook and L-shaped member in one piece, or otherwise uniting them into one piece, as shown in the drawing, the assembled handle is given a rigidity that is greatly desired; the finger hook cannot turn around and get out of proper position with respect to the reel, even though the riveting over of the hand grip support may not be as thoroughly done as desired. In addition to being firm and rigid, the handle is light in weight because the various parts are so formed that rigidity and firmness are secured without making them unduly heavy. Thus, the body portion of the handle, upon which the reel is mounted is made arcuate in order to provide firmness and rigidity although a relatively thin material is used.

The L-shaped member and the finger hook likewise can be made of relatively thin material because, when combined with the body member, they are given additional support by that member. The protruding part of the finger hook, being relatively short and also embossed at the bend, is firm without being heavy.

The forward part of the handle is constructed in a manner similar to that hereinabove described for the hand grip portion. It comprises a grip 25 of cork, wood or other suitable material on a socket pin 20 having a reduced section 21 at one end, which protrudes through a hole in the upturned leg 3 and is riveted over to force the ring or washer 22 into intimate contact with the upturned leg 3, thereby firmly uniting the socket pin 20 and the upturned leg 3. If desired the ring or washer 22 may be omitted and the riveted portion may be driven directly against the leg 3 of the body member; or the socket pin 20 may be threaded and a nut may be drawn up on the thus threaded portion to join the various members. Welding of the pin 20 to the leg 3 may be utilized for uniting the members.

The forward end of the socket pin 20 is made tubular or is drilled out to provide a receptacle for the rod 23. The drilling of the socket pin 20 is not carried to the point whereby there would be provided a continuous opening from one end to the other. The rod receptacle being thus closed off at the rear end, suction and friction are utilized in holding the rod in place. Similar results can be obtained by using tubular material for the socket pin and closing off the one end to provide the desired suction effect when the rod is inserted. If desired, the blocking off of the tubular member can be omitted, but to do so dispenses with the suction effect.

The present invention provides a handle for fish poles that is inexpensive to construct and yet has certain advantages obtainable heretofore only in high priced rods.

One such advantage is that the low cost of manufacture permits the use of a detachable rod. Heretofore, inexpensive handles could not be provided with detachable rods because the cost of manufacture of the handle was too great to permit the additional expense incident to the detachable rod.

Not only are the component parts of the handle of the present invention inexpensive, but the assembly of these parts also is an inexpensive operation.

Having thus described my invention, I claim:

1. A handle for a fish pole comprising a body member having upturned ends and an arcuate section between said ends, a separately fashioned tubular pin riveted to one of said upturned ends, said pin having the end adjacent the body member closed and the opposite end open, and a separately fashioned pin riveted to the other of said upturned ends.

2. A handle for a fish pole comprising a pressed metal body member having upturned ends and an arcuate section between said ends, a separately fashioned tubular pin fastened to one of said upturned ends, said pin having the end adjacent the body member closed and the opposite end open, and a separately fashioned pin fastened to the other of said upturned ends.

3. A handle for a fish pole comprising a pressed metal body member having upturned ends and an arcuate section between said ends, a separately fashioned tubular pin fastened to one of said upturned ends, and a separately fashioned pin fastened to the other of said upturned ends.

4. A handle for a fish pole comprising a pressed metal body member having upturned ends and an arcuate section between said ends, a separately fashioned tubular pin with a continuous wall fastened to one of said upturned ends, said pin having the end adjacent the body member of reduced diameter, and a separately fashioned pin fastened to the other of said upturned ends with a shoulder against said end.

5. A handle for a fish pole comprising a pressed metal body member having upturned ends and an arcuate section between said ends, a separately fashioned tubular pin with a continuous wall riveted to one of said upturned ends, said pin having the end adjacent the body member closed and of reduced diameter and the opposite end open, and a separately fashioned pin riveted to the other of said upturned ends with a shoulder against said end.

6. A handle for a fish pole comprising a pressed metal body member having at one end an upturned leg with a hole therethrough and a tubular pin having a reduced section at one end which protrudes through said hole and the end of which is riveted, an upturned leg with a hole therethrough to receive a hand grip support, a finger grip adjoining said latter leg and projecting from said body portion in a direction opposite to the direction the said leg projects, said finger grip having a hole therethrough in register with the hole in said latter leg, and an L-shaped member with one side of the L adjoining said leg on the one side of said leg away from the said finger grip and the other side of the L being adjacent to the said body member and projecting in the same direction, the first mentioned side of said L-shaped member having a hole therethrough in register with the holes in said leg and said finger grip, said finger grip and said L-shaped member being joined at the end of said leg away from said body portion, and said leg, finger grip and L-shaped member being rigidly united by said hand grip support, the end of which passes through the registering holes and has a shoulder abutting said finger grip and is riveted over at the end which is adjacent to the said L-shaped member.

7. A handle for a fish pole comprising a pressed metal body member having at one end an upturned leg with a hole therethrough and a tubular pin having a reduced section at one end which protrudes through said hole and the end of which is riveted, an upturned leg with a hole therethrough to receive a hand grip support, a finger grip adjoining said latter leg and projecting from said body portion in a direction opposite to the direction the said leg projects, said finger grip having a hole therethrough in register with the hole in said latter leg, and an L-shaped member with one side of the L adjoining said leg on the side of said leg away from said finger grip and the other side of the L being adjacent to the said body member and projecting in the same direction, the first mentioned side of said L-shaped member having a hole therethrough in register with the holes in said leg and said finger grip, and said leg, finger grip and L-shaped member being rigidly united by said hand grip support, the end of which passes through the registering holes and has a shoulder abutting said finger grip and is riveted over at the end which is adjacent to the said L-shaped member.

8. A handle for a fish pole comprising a metal body member having at one end an upturned leg with a hole therethrough and a tubular pin having a reduced section at one end which protrudes through said hole and the protruding end of which is riveted, and the other end having an upturned leg with a hole therethrough to receive a hand grip fastening means, a finger grip adjoining said leg and projecting from said body portion in a direction opposite to the direction the said leg projects, said finger grip having a hole therethrough in register with the hole in said leg, an L-shaped member with one side of the L adjoining said leg on the side of said leg away from the said finger grip and the other side of the L being adjacent to the said body member and projecting in the same direction, the first-mentioned side of said L-shaped member having a hole therethrough in register with the holes in said leg and said finger grip, said finger grip and said L-shaped member being joined at the end of said leg away from said body portion, and said leg, finger grip and L-shaped member being rigidly united by said hand grip fastening means which passes through the registering holes.

GEORGE O. BENSON.